United States Patent

[11] 3,628,807

| [72] | Inventors | William H. Fullington<br>Ballwin;<br>Melvin O. Maisak, Florissant, both of Mo. |
|---|---|---|
| [21] | Appl. No. | 835,455 |
| [22] | Filed | June 23, 1969 |
| [45] | Patented | Dec. 21, 1971 |
| [73] | Assignee | Pet Incorporated<br>St. Louis, Mo. |

[54] MOBILE MERCHANDISER CART
13 Claims, 18 Drawing Figs.

[52] U.S. Cl..................................................... 280/79.3, 211/128
[51] Int. Cl...................................................... B62b 5/00
[50] Field of Search............................................. 280/79.3; 193/2; 312/250; 211/128, 126; 186/1

[56] References Cited
UNITED STATES PATENTS

| 2,385,559 | 9/1945 | Wenthe........................ | 280/79.3 |
| 3,006,707 | 10/1961 | Rossi............................ | 312/250 |
| 3,237,721 | 3/1966 | Thompson.................... | 186/1 |
| 3,272,528 | 9/1966 | Young et al. ................. | 280/79.3 |
| 2,218,444 | 10/1940 | Vineyard...................... | 193/2 |

Primary Examiner—Benjamin Hersh
Assistant Examiner—Robert R. Song
Attorney—Richard G. Heywood ABSTRACT: A mobile merchandiser cart for the transportation, storage and display of food and beverage products from the production source to the retail consumer, the cart having a plurality of sloping shelves provided with antifriction surfaces. In addition, the cart may have offset wheel means and cantilevered shelves on supporting end panels constructed and arranged to provide nesting of the carts when empty.

INVENTORS:
WILLIAM H. FULLINGTON
MELVIN O. MAISAK
BY Gravely, Lieder & Woodruff
ATTORNEYS.

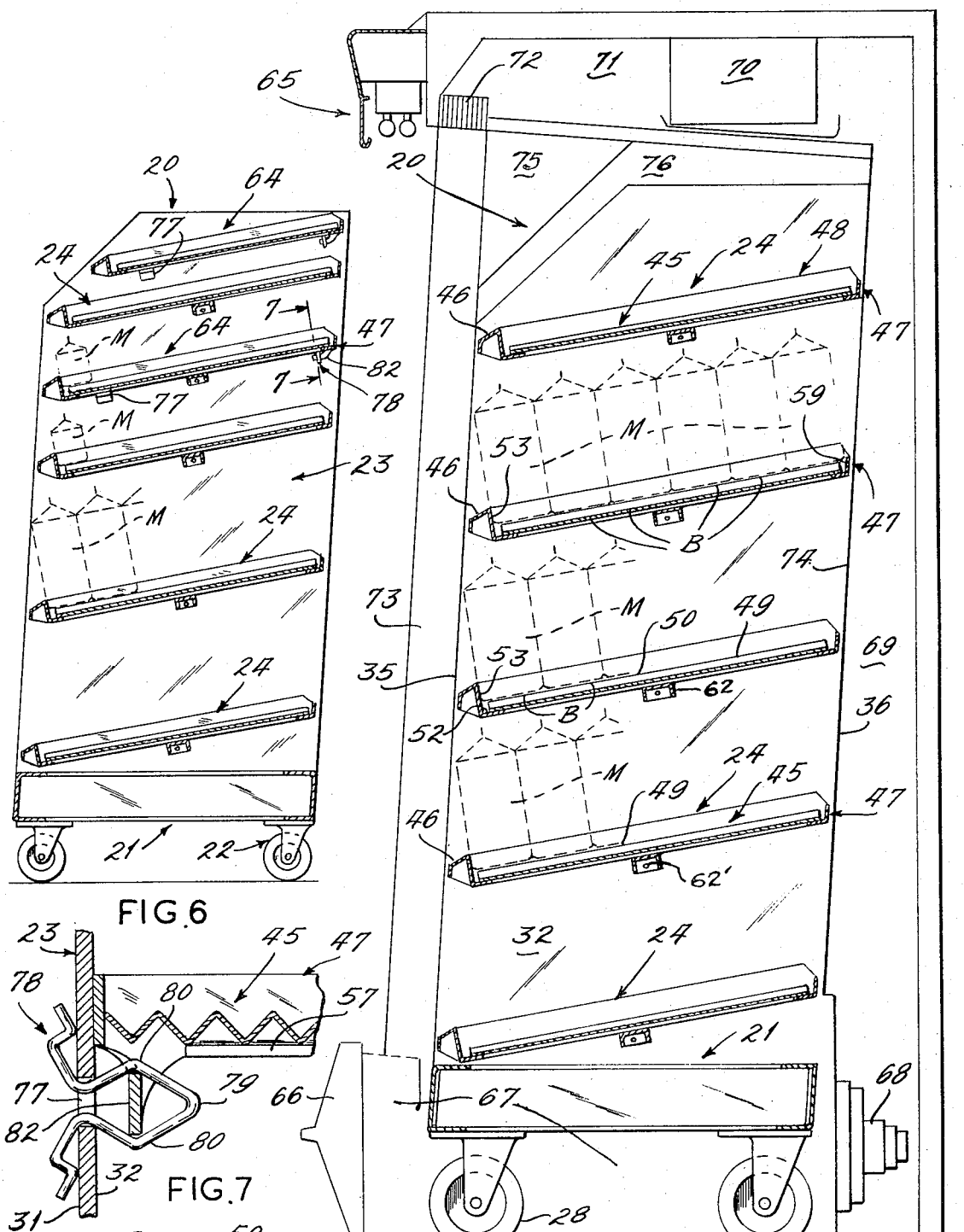
FIG. 5
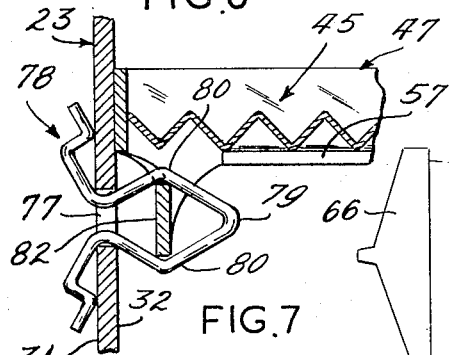
FIG. 6
FIG. 7
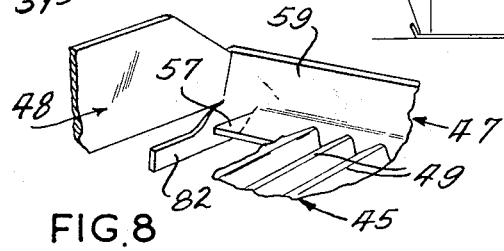
FIG. 8
INVENTORS:
WILLIAM H. FULLINGTON
MELVIN O. MAISAK
BY Gravely, Lieder & Woodruff
ATTORNEYS.

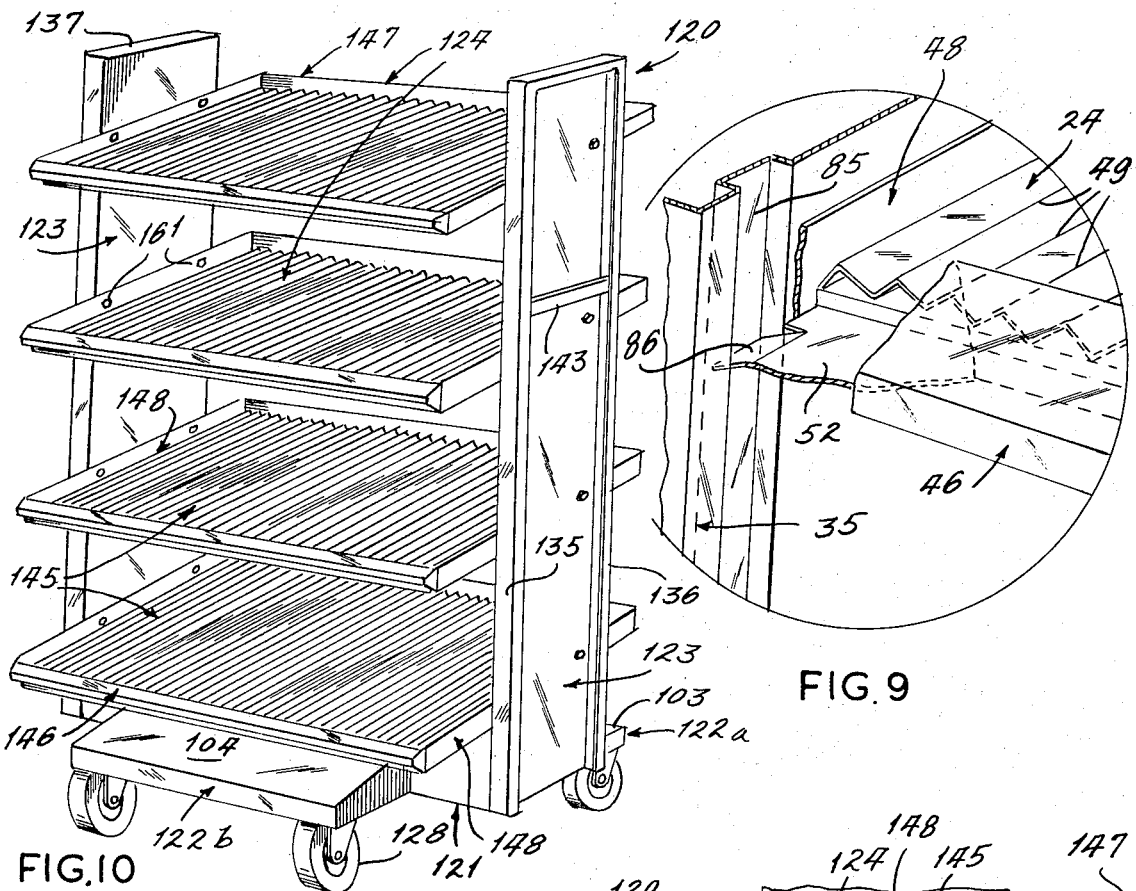
FIG.9
FIG.10
FIG.11
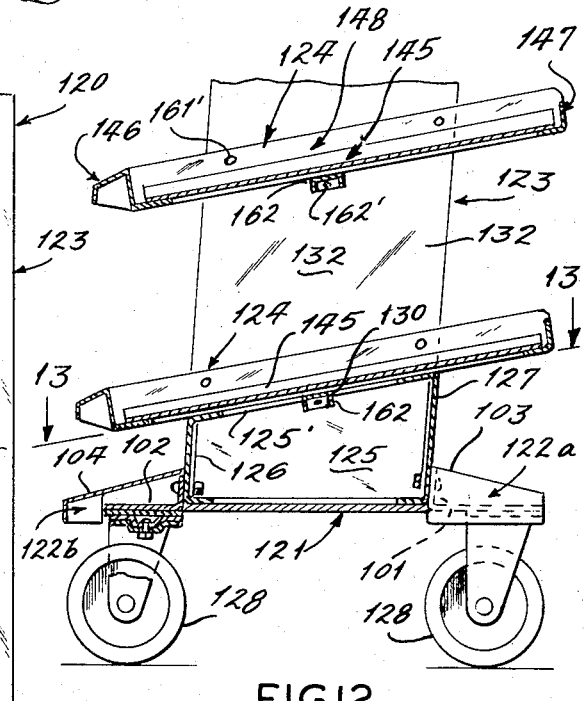
FIG.12
INVENTORS
WILLIAM H. FULLINGTON
MELVIN O. MAISAK
BY Gravely, Lieder & Woodruff
ATTORNEYS.

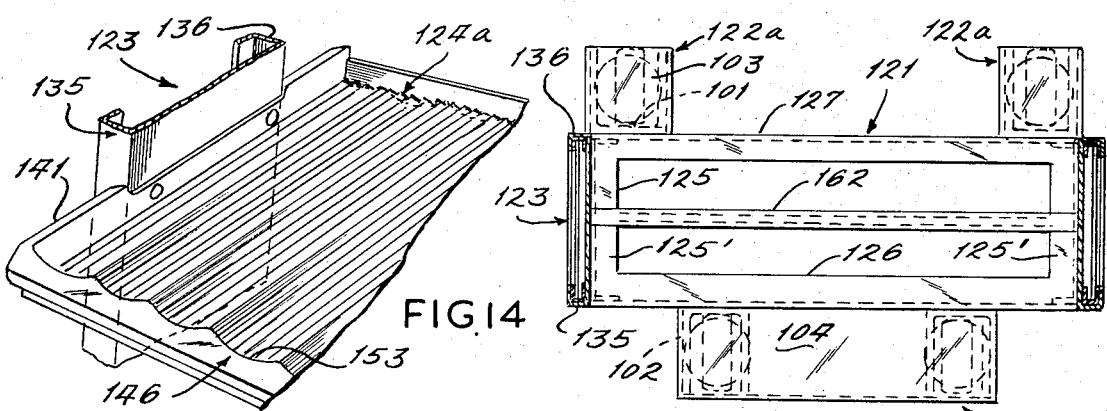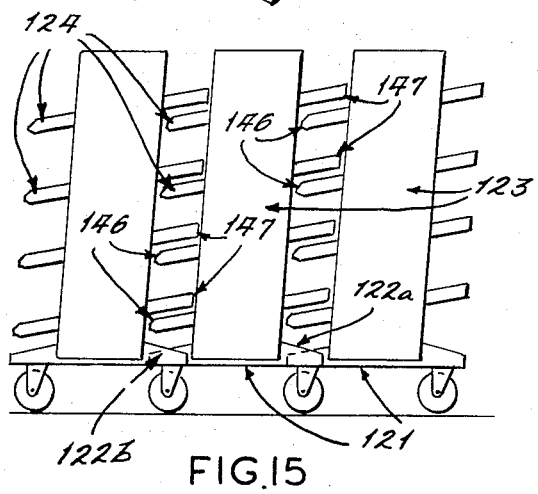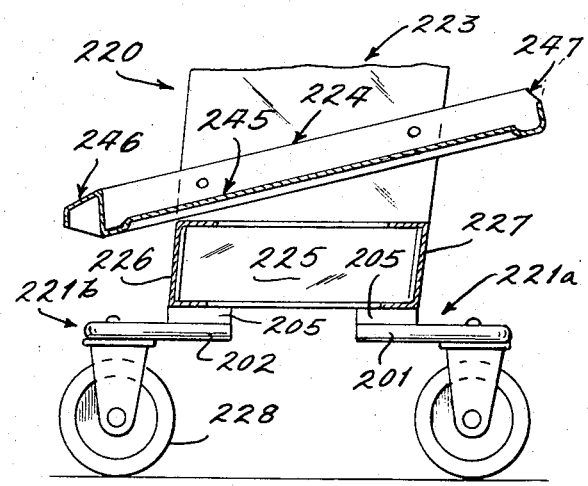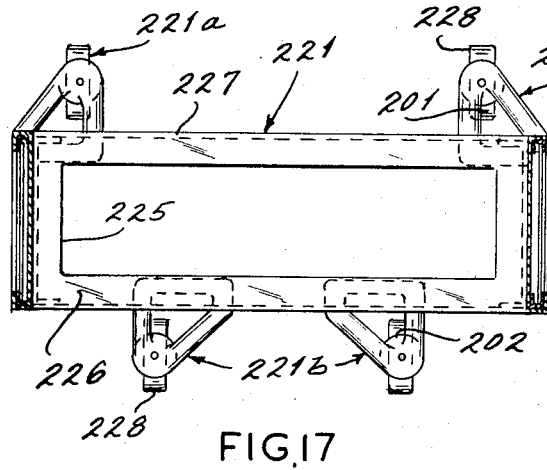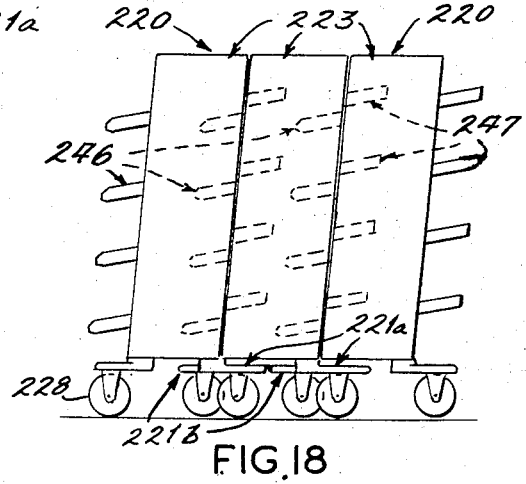

MOBILE MERCHANDISER CART

BACKGROUND OF THE INVENTION

The invention relates in general to merchandiser carts for food and beverages products and more particularly to improvements in mobile carts for transporting, storing and displaying a substantial weight and volume of such products in refrigerated environs.

The well-known concept of utilizing a mobile unit to function as a storage, transportation and display unit for various products has recently been stimulated in the food and beverage product field by reason of the substantial savings afforded by reduced handling costs of smaller case or tray units and the development of automatic product handling equipment capable of placing food or beverage containers into the cart in the production facility. Briefly stated, the mobile units are loaded with product (by automatic or semiautomatic equipment or by hand) at the production facility, and several units are loaded onto a truck and thus utilized in transporting the product to a food store (or other point of sale); these units then being unloaded from the truck and used in storing the product and/or in displaying the product at the food store for convenient consumer selection.

Prior art carts have been functional as a basic transportation and storage unit, but have not provided the degree of versatility for the use of different handling equipment for loading and unloading such carts from refrigerated trucks and, in addition, the prior art carts have not been fully acceptable as a merchandiser for display of product and have also presented cleaning and other problems.

SUMMARY OF THE INVENTION

The invention is embodied in a merchandiser cart for food and beverage products, including a rigid base frame with upstanding end panels, and plural shelves extending between the end panels and having sloping antifriction product carrying surfaces.

One of the principal objects of the present invention is to provide an improved mobile unit for the transportation, storage and display of food and beverage products. Another object is to provide merchandiser cart that is rigid and sturdily constructed to hold substantial weight and volume loads and prevent displacement thereof during transportation from the production facility and is adapted for the use of different lifting equipment for loading the cart onto a truck for such transportation, and yet, is fully mobile and is easily moved by one person from area to area or to a display fixture. Another object is to provide a merchandiser cart having angular shelves to provide better product visibility during display and self-feeding of the rearward products to the front of the shelves for accessibility and convenient self-service by the consumer. Still another object is to provide a cart adapted to minimize products contamination in the event of breakage or leakage of beverages and adapted for easier cleaning. Still another object of the present invention is to provide a merchandiser cart that will be nestable with like carts, when empty, to occupy less space in the production facility or food store and provide greater flexibility in filled cart delivery and empty cart return schedules.

These and still other objects and advantages will become more apparent hereinafter.

BRIEF DESCRIPTION OF THE DRAWINGS

For purpose of illustration and disclosure, the invention is embodied in the parts and in the arrangements and combinations of parts hereinafter described and claimed. In the accompanying drawings which form a part of the specification and wherein like numerals refer to like parts wherever they occur:

FIG. 5 is a cross-sectional view of a merchandiser cart (as may be taken along line 5—5 of FIG. 3), but modified to incorporate one more shelf and illustrate the cart as positioned in a refrigerated fixture for display of the product shown in phantom lines.

FIG. 6 is a cross-sectional view of a merchandiser cart modified to incorporate removable insert shelves, FIG. 7 is an enlarged fragmentary view taken substantially along line 7—7 of FIG. 6 and showing an insert shelf locking feature, FIG. 8 is an enlarged fragmentary perspective view of the insert shelf lock tab shown in FIG. 7, FIG. 9 is an enlarged fragmentary perspective view showing a modified shelf and end panel arrangement as taken within the circled area 9 in FIG. 1, FIG. 10 is a perspective view of another embodiment of the merchandiser cart adapted for nesting with similar carts, FIG. 11 is a rear elevational view of the nestable merchandiser cart shown in FIG. 10, FIG. 12 is an enlarged cross-sectional view taken substantially along line 12—12 of FIG. 11, FIG. 13 is a plan cross-sectional view showing the base of the nestable merchandiser cart taken substantially along line 13—13 of FIG. 12, FIG. 14 is a fragmentary perspective view of a modified shelf for the merchandiser cart shown in FIG. 10, FIG. 15 is a diagrammatic end elevational view showing several merchandiser carts of FIG. 10 in nestable relationship, FIG. 16 is a view similar to FIG. 12, but showing a modified base construction for the nestable merchandiser cart, FIG. 17 is a view similar to FIG. 13, but showing the modified base construction of FIG. 16, and FIG. 18 is a view similar to FIG. 15, but showing the nesting of carts having the base construction of FIGS. 16 and 17.

DESCRIPTION OF THE PREFERRED EMBODIMENTS

Figure 1:
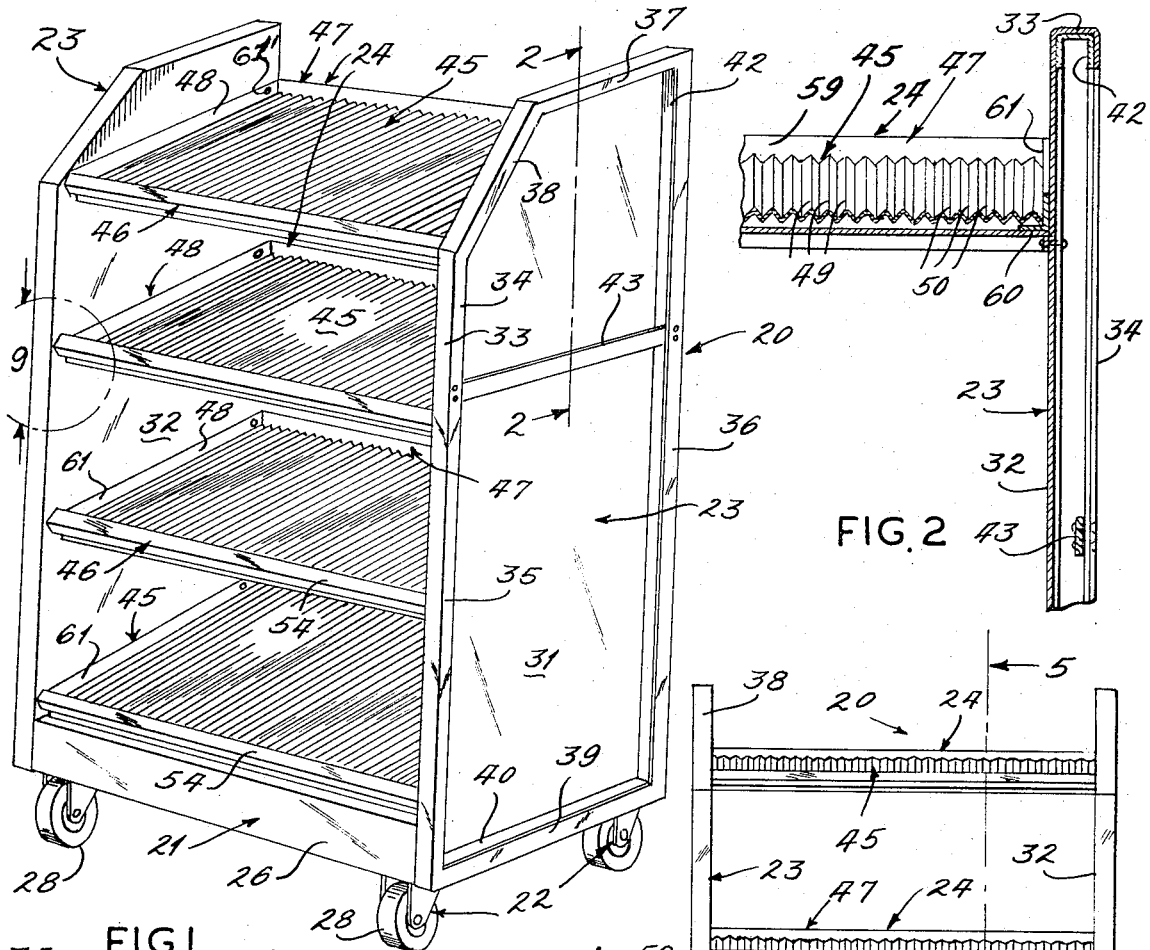
FIG. 1 is a perspective view of a mobile merchandiser cart embodying the present invention.
Figure 2:
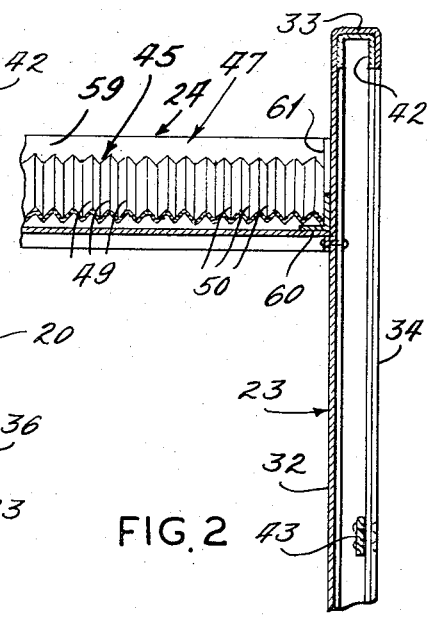
FIG. 2 is an enlarged fragmentary cross-sectional view taken substantially along line 2—2 of FIG. 1.

Referring to FIGS. 1–5 of the drawings, a merchandiser cart 20 embodying the present invention comprises a base frame 21 mounted on wheel units 22, opposed end panels 23 secured to the base 21 and a plurality of shelves 24 secured between the end panels 23.

The base frame 21 is of rectangular configuration having opposed end walls 25 and opposed front and back walls 26 and 27, respectively, all being channel-shaped or of open C-shape configuration and being welded or otherwise assembled together to form a rigid, integral base unit. The wheel units 22 are preferably of the caster type in which the wheels 28 fully swivel on base plates 29 secured at the corners of the base frame 21.

The end panels 23 are formed with a main body panel 31 having a smooth inner surface 32 exposed to the product area of the cart 20, and the end panels 23 are formed peripherally with outwardly turned flanges 33 and inwardly turned flanges 34 defining channel-shaped vertically disposed front and rear marginal members 35 and 36, respectively, a horizontally disposed top marginal member 37 extending forwardly from the rear member 36 and an angular marginal member 38 interconnecting the front and top members 35 and 37. The bottom of the end panels 23 may be closed and reinforced by flanges 40 extending into the opposed channels of the front and rear members 35 and 36 to form tubular lower members 39. In addition, the front, rear, top and angular members 35, 36, 37 and 38 are reinforced by a supplementary channel-shaped insert member 42. The end panels 23 are rigidly secured to the end walls 25 of the base frame 21 by suitable means, such as welding or bolting. A hand bar 43 is secured at a convenient height between the front and rear members 35 and 36 on the inner surface of the inturned flanges of the insert member 42.

Each of the shelves 24 of the merchandiser cart 20 comprises an imperforate main body panel 45, a front rail member 46, a rear rail member 47 and side members 48. As will become more apparent hereinafter, an important feature of the invention resides in the product carrying surface characteristics of the main panel 45 and, as shown in the drawings, the preferred configuration of the main panel 45 is a corrugation providing a series of parallel ridges 49 and valleys 50. The front rail member 46 extends transversely of the cart 20 between the end panels 23 and is formed with a supporting flange 51 for the main panel 45, a spill trough or channel 52 adjacent to, and preferably recessed below, the valleys 50 of the main panel 45, a vertically disposed product abutment surface 53 and an angular front wall 54 extending outwardly and downwardly to form an interior recess 55. This front wall 54 of the rail member 46 is constructed for use as a hand grip in manipulating the cart and the outer surface may also be fitted with conventional price tag or product identification means. The rear rail member 47 extends transversely between the end panels 23 and is formed with a support flange 57 for the main panel 45 and an upturned or vertically disposed flange 58 forming an inner abutment surface 59. The side rail members 48 extend along each laterally disposed edge of the main panel 45 and comprise an inturned support flange 60 for the main panel 45 and a vertically disposed flange 61 secured to the front and rear rail members 46 and 47 and, preferably closing off the ends of the spill trough 52. The main panel 45 is carried on and secured to the support flanges of the front, rear and side rails 46, 47 and 48 of the shelves, although it will be apparent that the main panel 45 and side rail flange 61 may be formed integral or the main panel 45 and front and rear rails 46 and 47 may be formed as an integral unit, as will appear hereinafter. The shelves 24 are mounted on the nd panels 23 in a predetermined angular position sloping downwardly from the rear rail 47 to the front rail 46, the side rail flange 61 being secured to the inner surfaces 32 of the end panels in a manner to present substantially smooth surface to the product area of the shelves 24. Although the shelves 24 may be spot welded or permanently secured to the end panels 23, it is preferred that they be secured by bolts 61' extending through the flanges 61 adjacent to the rear rail 47 and in the recess 55 of the front rail 46. This bolted construction facilitates assembly and repair of the shelves 24 and, similarly, the end panels 23 may be bolted to the base 21 so that the cart components can be more conveniently packaged and shipped by the manufacturer thereof to the cart owner for assembly.

In addition to other reinforcing means in the cart 20, inverted channel members 62 may be provided below the shelves 24 extending transversely between the end panels 23 and secured thereto by bolts 62' or the like for the purpose of strengthening the shelf means. The shelves 24, and merchandiser cart 20 in general, are constructed to bear substantial weight loads and to support products against displacement and additional stress occurring during over-the-road transportation of the product loaded cart from production facility to food store or point of sale; and the cart 20 is adapted to all types of truck loading equipment, such as fork lifts, cranes, side loaders, tailgate loaders, and the like. The abutment surfaces 53 of the shelf front rails 46 are substantially normal to the product surfaces of the main panels 45 and have a predetermined depth greater than the depth of the abutment surfaces 59 of the shelf rear rails 47. These product abutment surfaces 53 and 59 also are spaced a predetermined distance so that the product carrying area of the shelves 24, as defined by the front and rear rail abutments 53 and 59 and the side rail flanges 61, essentially accommodate a certain quantity of the product. However, in the food and beverage product field there are some standard base dimensions affording versatility in the use of the cart 20.

By way of example, liquid product, such as milk, is packaged in quart, half-gallon and gallon containers M (as shown in phantom lines in FIG. 5) of standard height and which occupy a base area proportionate with their respective volumetric sizes. Quart and gallon containers are directly compatible in base area whereas half-gallon containers are interchangeable with gallon containers on a 3 to 2 ratio. This same condition exists as to pint, half-pint units of other dairy products, although the vertical dimension of such containers is such that insert shelves 64 may be provided between the fixed shelves 24 as shown in FIGS. 6–8 and will be described more fully hereinafter.

Still referring to FIGS. 1–5, it will be apparent that the back side of the merchandiser cart 20 is open and is adapted for rear loading of product by automatic handling equipment in the production facility onto the shelves 24 over the relatively short rear rail abutment flanges 58. The product, milk containers M, slide down the sloping shelf panels 45 against the product abutment and holding surfaces 53 of the front rails 46 and each shelf is filled with the selected product or size of product with the last or rear product row fitting against the rear rail abutment surface or lip 59. By reason of the shelf angularity, the weight or direction of load of the product containers M is downwardly and forwardly toward the front rail 46 where to substantial depth of the abutment surface 53 retains the front row of product containers and the interface or surface engagement between adjacent rearward containers and load imposed acting on the front row prevents displacement. However, the front row container M can be lifted upwardly over the front rail 46 by the store customer. It should be recognized that the usual plastic coated (formerly waxed) milk container M does not by itself usually have a straight sidewall, but bulges slightly above the base so that the center of weight or load is in the lower one-third of the container. Accordingly, the containers M on a fully loaded shelf 24 are not literally wedged in place on the product carrying shelf surface 45, but this inherent property is utilized in achieving a similar result at a point slightly above the rear rail flanges 58 and the transverse shelf area dimensions is predetermined to obviate this wedging effect. Upon removing a front row container M, the rearward containers slide downwardly against the front rail 46.

As previously indicated, the antifriction shelf surface characteristics are an important feature of the invention in addition to the downwardly and forwardly sloping angularity of the shelves 24 for gravity or self-feeding of containers M to the front rail 46 for dispensing. The plurality of parallel ridges 49 of the main shelf panels 45 form glide surfaces on which the bases B of the containers M sit in substantially line contact. It should be noted that the ridges 49 are relatively closely spaced so that the weight load of each container is distributed to several ridges whereby an improved glide surface is provided. The valleys 50 of the corrugated shelf panels 45 form spill channels so that any leakage of liquid from imperfect or damaged containers M will be diverted down into the transverse spill channel 52 of the front rail 46. It will be understood that the shelves 24 or main panels 45 thereof may be formed of any suitable material, such as stainless steel, fiberglass or the like, but stainless steel with a so-called satin finish applied with the "grain" running in the direction of the ridges 49 has been discovered to produce a superior surface. It is also possible to coat the shelf panel with a suitable pebbled vinyl or other antifriction material to improve the glide characteristics thereof.

Referring now particularly to FIG. 5, the merchandiser cart 20 is illustrated as positioned in a typical refrigerated showcase 65 for display and dispensing of product (milk container M). Briefly stated, the showcase 65 comprises a movable low-front wall 66 obscuring the base 21 of the cart 20 and defining a return airflow channel 67 in front of and under the cart for movement of refrigerated air to a fan 68, which discharges or recycles such air upwardly in a rear duct 69 to an evaporator coil 70 positioned in a chamber 71 in the top of the showcase 65. The air flows forwardly across and through the evaporator 70 for recooling and is discharged downwardly through an air straightening means 72, such as honeycomb, and forms a curtain 73 of refrigerated air across the display opening of the showcase to maintain a predetermined product temperature The rear panel 74 of the showcase forming the duct 69 is disposed at a predetermined angle to vertical, and it will be seen that the front and rear members 35 and 36 of the cart end panel 23 are also angularly canted or disposed from vertical to form a complementary fit against the rear panel 74 and prevent short circuiting of airflow behind the cart 20 to the fan 68. The length of the showcase 65 between its ends 75 is predetermined to accommodate multiple carts 20, but vertical case partitions 76 are provided intermediate ends 75 between each cart to provide a close tolerance preventing any substantial short circuiting of air and assisting in rectilinear airflow in the air curtain 73 especially when an empty cart 20 is removed from the showcase 65 for replacement by a product loaded cart 20. In addition to the complementary cart-to-showcase fit achieved by the angularity of the cart end panels 23 and showcase rear wall 74, it will be seen that the front rail 46 of each successively higher shelf 24 in the merchandiser cart 20 is recessed or set back slightly further relative to a vertical line and corresponds to the angularity of the end panels 23 whereby an angular flow of the air curtain 73 downwardly accommodates improved air control and maintenance of more even temperature. It will also be noted that the merchandiser cart 20 provides for improved product display due to the angularity of the shelves 24 whereby the product is canted forwardly to expose both the top and front side surface and due to the opposite angularity of the end panel front members 35 and corresponding shelf recess whereby the product on each successively lower shelf 24 is set forwardly and exposed both to the refrigerated air curtain for cooling and to the view of the store customer. The angular walls 54 of the front rails 47 project to adjacent the front edges of the end panel front members 35 and slightly beyond the most forward portion of the product to function as bumper guards for the protection of the product on the cart 20.

Referring now to FIGS. 6–8 illustrating a modified cart 20 to accommodate the removable insert shelves 64 for short containers, the end panels 23 may be provided with slots 77 adjacent to the front and rear members 35 and 36 and preferably spaced above the upper and second shelves 24 to most conveniently locate the smaller product. An integral spring clip 78 or like removable retention means is positioned in the openings 77 and defines a closed body loop portion 79 having opposed angular arms 80 projecting beyond the inner surface 32 of the end panel body 31, the clip 78 having retaining arms 81 bearing against the outer panel body 31 to hold the clip 78 in place. A portion of the supporting flange 57 of the rear rail member 47 may be struck down and turned forwardly with a 90° twist to form a lock tab 82 which is adapted to be inserted between the angular arms 80 of the spring clip 78 to secure both the clip and the removable shelf 64 in place in the cart 20. Alternatively, the clip 78 may be turned to provide a vertical opening and a locking lug (not shown) may be formed from the side rail flange 60 of the shelf 64. A similar locking arrangement may be provided for both the front and rear of the movable shelf 64.

Referring to FIG. 9, a modified spill channel arrangement for the shelves 24 is shown in which the main walls 31 of the end panels 23 are each provided with a vertically disposed recess or drain channel 85 adjacent to the front member 35. The ends of the spill channels 52 of the front rail members 46 are not closed by the side rail 48, but are struck down to form a drain lip 85 so that any excess leakage will be diverted into the drain channel 85.

Referring now to FIGS. 10–18 in which another preferred embodiment of the invention is shown and, with particular reference to FIGS. 10–15 in which similar reference numerals in the "100 series" will identify like or similar parts to the previously described embodiment, this embodiment comprises a nestable merchandiser cart 120 adapted, when empty and ready to be returned to the production facility, to the interfit or "nested" into similar carts 120 thereby saving space and permitting more empty carts to be returned than may be delivered.

The cart 120 has a main base frame 121 mounted on rear and front wheel units 122a and 122b opposed end panels 123 secured to the base frame 121 and a plurality of shelves 124. The main base frame 121 and end panels 123 are substantially shorter than the shelves 124 and the base frame 121 is provided with trapezoidal-shaped end walls 125 (FIG. 12), a front wall 126 and a higher rear wall 127 to compensate in strength and rigidity for the relatively smaller dimension of the end wall and end panels 123. The lowest shelf 124 is positioned adjacent to the upper surfaces of the channel-shaped members of the base frame 121, and the inverted shelf supporting channel 162 therefor is notched at 163 and interfit with the upper flanges 125' of the end wall members 125 and welded to provide additional rigidity to the base 121. The rear wheel units 122a are secured to the base frame rear wall 127 at the ends thereof and have a structural frame extension 101 projecting rearwardly and mounting the caster-type wheels 128. Similarly, the front wheel unit 122b has a structural frame extension 102 secured on the base frame front wall 126 intermediate the end portions thereof and mounts the caster-type wheels 128 within the spaced distance between the frame extensions 101. Cover plates 103 and 104 may be provided for the rear and front wheel units 122a and 122b. The end panels 123 and shelves 124 are essentially identical to the shelves 24 previously described, but that the shelves 124 are cantilevered in front and back of the front and rear members 135 and 136 of the end panel 123 and the wheels 128 are still widely spaced to stabilize the cart 120. As shown in FIGS. 11 and 15, the front wheel unit 122b is adapted to fit between the rear wheel units 122a and abut the base frame rear wall 127, and the angularity of the shelves 124 permits the front rail portions 146 of one cart to be received under the rear rail portions 147 of another cart so that the carts 120 can be nested.

Referring to FIG. 14, a modified cantilevered shelf 124a of fiberglass or the like may be formed with a molded side railing 141 to wrap around and be secured to the front and rear panel members 135 and 136. In addition, the front rail member 146 may have a sculptured abutment wall 153 for certain products, such as cylindrical bottles or cans.

Figure 4:
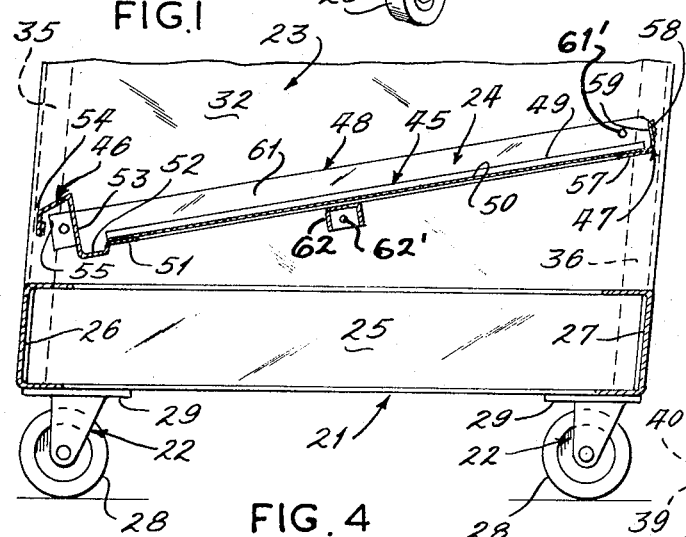
FIG. 4 is an enlarged cross-sectional view taken substantially along 4—4 of FIG. 3.
Figure 3:
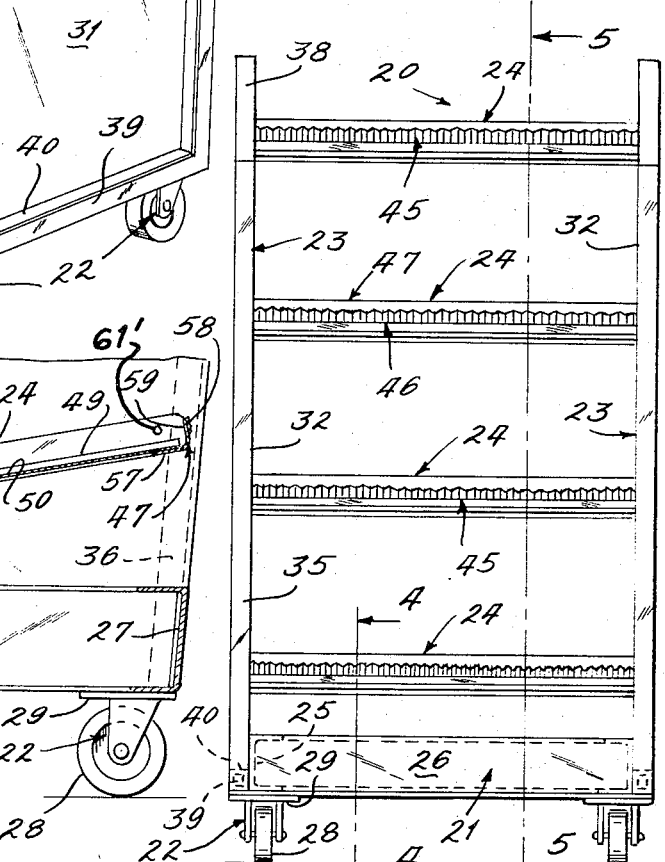
FIG. 3 is a front elevational view of the merchandiser cart.

It will be apparent that the trapezoidal-shaped base frame 121 shown in FIGS. 10–13 may be utilized in the FIGS. 1–5 embodiment of the invention, and that the FIG. 4 shelf 124a may also be used in this embodiment.

Referring particularly to FIGS. 16–18, reference numerals in the "200 series" will identify another modification of the cart invention affording increased nesting of carts 220. In this arrangement the base frame 221 is more similar to that shown in FIGS. 1–5 to provide clearance above the rear wall 227 and below the rear rail portion 247 of the lowest shelf 224 for the front rail portion 246 of the lower shelf 224 of another cart to be recessed therein, and the base frame may be strengthened by other means such as a diagonal cross frame member (not shown). Furthermore, the wheel unit structural members 201 and 202 are formed of tubular material and are spaced below the frame 221 by spacer plates 205 so that the wheel units 221a and 221b will not only interfit, but be received beneath the frame of an adjacent cart 220 during nesting, as shown in FIG. 18.

It will be understood that steam cleaning or the like of the novel merchandiser cart 20 (120,220) at the production facility is important to remove any foreign matter or spillage of product therefrom to maintain a sanitary condition and to keep the antifriction glide surfaces 49 of the shelves 24 cleaned of plastic or wax from the containers M and otherwise in a nonresistant condition to movement of the product during loading at the production facility or self-feeding of product to the front rail 46 during display and customer removal of front row containers.

This invention is intended to cover all changes and modifications of the examples of the invention herein chosen for purposes of the disclosure which do not constitute departures from the spirit and scope of the invention.

What is claimed is:

1. A merchandiser cart for food and beverage products comprising base frame means mounted on front and rear wheel units, said wheel units comprising frame extension means projecting forwardly and rearwardly from said base frame and said front units being transversely offset relative to said rear units, upstanding opposed end panels secured to said base frame means, and shelf means mounted between said end panels, said shelf means having a front product abutment margin extending transversely of said end panels and a product-bearing surface sloping downwardly and forwardly toward said abutment margin.

2. A mobile merchandiser cart for food and beverage products comprising base frame means, upstanding opposed end panels secured to said base frame means, and shelf means mounted between said end panels, said shelf means having a front product abutment margin extending transversely of said end panels and a product bearing surface sloping downwardly and forwardly toward said abutment margin, said shelf means being cantilevered beyond the vertical margins of said end panels, and said base frame being mounted on wheel units and constructed and arranged to provide for interfitting at least two of said carts into a nested relationship.

3. A mobile merchandiser cart for food and beverage products comprising rigid base frame means mounted on wheel units, vertically disposed upstanding opposed end panels secured to said base frame means and having front and rear marginal members angularly canted relative to vertical to slope rearwardly upwardly from said base frame to the top thereof, and a plurality of vertically spaced shelf means having front product abutment margins extending transversely of said end panels and a plurality of closely adjacent antifriction product support ridges, said shelf means being angularly secured between said end panels to slope downwardly toward said abutment margins to provide self-feeding of product on said product surfaces thereto, and the front product margin of each successively higher shelf means being offset from vertical rearwardly of the lower shelf means.

4. The merchandiser cart according to claim 3 in which said base frame means comprises opposed end members and opposed front and rear side members rigidly secured together, said end members being of trapezoidal configuration with the upper surfaces thereof sloping downwardly from said rear side member to said front side member at an angle substantially complementary to the slope of said shelf means.

5. The merchandiser cart according to claim 3 in which said shelf means product abutment margin is formed on a front rail member, said front rail member having a transverse spill channel at the lower end of said product bearing surface of said shelf means.

6. The merchandiser cart according to claim 5 in which a vertically disposed drain channel is formed in at least one of said end panels, and said transverse spill channel of said front rail member is constructed and arranged to form a discharge into said drain channel.

7. The merchandiser cart according to claim 5 in which said shelf means is corrugated and said product bearing surface comprises a series of transverse closely spaced ridges adapted to form multiple product glide means permitting product movement downwardly toward said abutment margin, and said corrugated shelf means forms a series of valleys between said ridges to provide for liquid drainage downwardly into said transverse spill channel.

8. The merchandiser cart according to claim 3 in which said product bearing surface of said shelf means comprises antifriction surface characteristics which, with said sloping angle of the shelf means, is adapted to form glide means for self-feeding product movement downwardly on said shelf means to said abutment margin.

9. The merchandiser cart according to claim 8 in which said product-bearing surface and said shelf means is corrugated and said glide means comprise a series of closely adjacent spaced ridges adapted to form multiple product support means.

10. The merchandiser cart according to claim 3 in which said product abutment margin of said shelf means is contoured to be complementary to a predetermined product configuration.

11. The merchandiser cart according to claim 3 in which said shelf means comprises front, rear and opposed side rail members defining a product-supporting area of predetermined front to rear and lateral dimension for a specified product, said front abutment margin being formed on said front rail member and extending substantially normal to said product-bearing surface and being of predetermined depth to prevent product displacement from said shelf.

12. The merchandiser cart according to claim 3 in which said end panels are provided with channel-shaped reinforcement means, and hand bar means recessed with said channel-shaped means.

13. The merchandiser cart according to claim 3 in which insert shelf means are removably fixed between said end panels in predetermined spaced relation with said first-mentioned shelf means.

* * * * *